(12) United States Patent
Kalkunte et al.

(10) Patent No.: US 10,230,645 B1
(45) Date of Patent: *Mar. 12, 2019

(54) DYNAMIC ADJUSTMENT OF QUALITY OF SERVICE PARAMETERS

(71) Applicant: Vivint, Inc., Provo, UT (US)

(72) Inventors: Venkat Kalkunte, Saratoga, CA (US); Pravin Bathija, San Jose, CA (US)

(73) Assignee: Vivint, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/671,114

(22) Filed: Aug. 7, 2017

Related U.S. Application Data

(63) Continuation of application No. 15/136,695, filed on Apr. 22, 2016, now Pat. No. 9,729,457, which is a
(Continued)

(51) Int. Cl.
| | |
|---|---|
| H04L 12/851 | (2013.01) |
| H04W 28/14 | (2009.01) |
| H04W 72/04 | (2009.01) |
| H04L 12/933 | (2013.01) |
| H04L 29/06 | (2006.01) |
| H04M 7/00 | (2006.01) |
| H04W 24/02 | (2009.01) |

(Continued)

(52) U.S. Cl.
CPC ............ *H04L 47/24* (2013.01); *H04L 45/123* (2013.01); *H04L 47/215* (2013.01); *H04L 49/1584* (2013.01); *H04L 69/161* (2013.01); *H04M 7/006* (2013.01); *H04W 24/02* (2013.01); *H04W 28/14* (2013.01); *H04W 72/0453* (2013.01); *H04L 2012/6454* (2013.01); *H04W 84/12* (2013.01)

(58) Field of Classification Search
USPC ....... 370/231, 232, 235, 237, 241, 328, 329, 370/468, 477, 395.21
See application file for complete search history.

(56) References Cited

U.S. PATENT DOCUMENTS

| | | |
|---|---|---|
| 6,373,824 B1 | 4/2002 | Tang et al. |
| 7,289,447 B2 | 10/2007 | Compton et al. |
| (Continued) | | |

FOREIGN PATENT DOCUMENTS

WO 2011124742 A2 10/2011

OTHER PUBLICATIONS

Lee, et al., "QoS-aware Hierarchical Token Bucket (QHTB) Queuing Disciplines for QoS-guaranteed DiffServ Provisioning with Optimized Bandwidth Utilization and Priority-based Preemption", IEEE, ICOIN, 2013, pp. 351-358.

*Primary Examiner* — Saumit Shah
(74) *Attorney, Agent, or Firm* — Holland & Hart, LLP

(57) ABSTRACT

A computer-implemented method for dynamic adjustment of quality of service parameters is described. In one embodiment, one or more quality of service (QoS) parameters of a client of a mesh network is set based on an expected bandwidth for the mesh network. An actual bandwidth for the mesh network is measured. One or more QoS parameters of the client is automatically changed in response to the actual bandwidth differing from the expected bandwidth. The change in the QoS parameters may be configured to compensate for the difference between the actual bandwidth and the expected bandwidth.

20 Claims, 13 Drawing Sheets

Related U.S. Application Data continuation of application No. 14/203,282, filed on Mar. 10, 2014, now Pat. No. 9,350,673.

(60) Provisional application No. 61/785,074, filed on Mar. 14, 2013.

(51) Int. Cl.
  *H04L 12/819* (2013.01)
  *H04L 12/721* (2013.01)
  *H04W 84/12* (2009.01)
  *H04L 12/64* (2006.01)

(56) References Cited

U.S. PATENT DOCUMENTS

| | | |
|---|---|---|
| 7,319,667 B1 | 1/2008 | Biederman |
| 8,385,193 B2 | 2/2013 | Wang et al. |
| 9,413,680 B1 * | 8/2016 | Kusters ................ H04L 67/146 |
| 2008/0031132 A1 | 2/2008 | Compton et al. |
| 2008/0080553 A1 | 4/2008 | Hasty et al. |
| 2008/0159135 A1 * | 7/2008 | Caram .................... H04L 47/10 |
| | | 370/230 |
| 2011/0103227 A1 | 5/2011 | Meier et al. |
| 2011/0205933 A1 | 8/2011 | Porat |
| 2011/0242978 A1 | 10/2011 | Klein et al. |
| 2014/0079016 A1 | 3/2014 | Dai et al. |

* cited by examiner

Link-sharing example.

800

```
# This is the configruation file for
# Route cost daemon
RouteCostMode=Auto
#RouteCostMode=Manual
Debug=Yes
Verbose=Yes

[Node1]
ra_ap0=192.168.100.10
ra_sta0=192.168.3.10
ra_sta1=192.168.4.10

[Node2]
eth0=192.168.200.20
ra_ap0=192.168.210.20
ra_sta0=192.168.2.20
ra_sta1=192.168.5.20

[Node3]
eth0=192.168.300.30
ra_ap0=192.168.310.30
ra_sta0=192.168.3.30
ra_sta1=192.168.6.30
ra_sta2=192.168.7.30
```

FIG. 8

DYNAMIC ADJUSTMENT OF QUALITY OF SERVICE PARAMETERS

CROSS-REFERENCE TO RELATED APPLICATIONS

The present Application is a continuation of U.S. patent application Ser. No. 15/136,695, titled: "Dynamic Adjustment Of Quality Of Service Parameters", filed on Apr. 22, 2016, which is a continuation of U.S. patent application Ser. No. 14/203,282, titled: "Dynamic Adjustment Of Quality Of Service Parameters", filed on Mar. 10, 2014, which claims priority to U.S. Provisional Patent Application No. 61/785,074, titled: "Dynamic Adjustment Of Quality Of Service Parameters In Response To Changing Network Conditions," filed on Mar. 14, 2013. The disclosures of each application listed above are incorporated by reference herein in their entireties.

TECHNICAL FIELD

This disclosure relates generally to methods and systems for adjusting quality of service (QoS) parameters in response to changing network conditions.

BACKGROUND

In a network, the quality of the connection (and thus the bandwidth available) can vary based on various conditions. Noise or interference on a physical wire, problems in a network device, and others, can reduce the actual bandwidth available to users of the network. These problems can be more significant in a wireless network where weather, device failure, and other factors can affect the ability to wireless transmit a signal, and thus affect bandwidth. In a mesh network, routing changes may affect bandwidth as nodes join and leave the network.

The changes in the actual bandwidth pose challenges for a network administrator and for clients of the network. For example, an Internet Service Provider (ISP) may want to provide the highest bandwidth possible for customers; however, changes in the actual bandwidth may affect all customers and create frustration. Certain applications (such as video streaming, voice over Internet protocol (VoIP) applications, and others) may be more sensitive to changes in the bandwidth than others. The ability to gracefully and dynamically adjust to changes in the network bandwidth would be useful.

SUMMARY

According to at least one embodiment, a computer-implemented method for dynamic adjustment of quality of service parameters is described. In one embodiment, one or more quality of service (QoS) parameters of a client of a mesh network may be set based on an expected bandwidth for the mesh network. An actual bandwidth for the mesh network may be measured. One or more QoS parameters of the client may be automatically changed in response to the actual bandwidth differing from the expected bandwidth. The change in the QoS parameters may be configured to compensate for the difference between the actual bandwidth and the expected bandwidth.

In one embodiment, changing one or more physical connection parameters of the network to improve the actual bandwidth. The QoS parameters may include one or more hierarchical token bucket parameters. In some cases, may be reduced a depth of the token bucket in response to a decrease in the actual bandwidth. The QoS for media traffic may be increased in response to the decrease in the actual bandwidth. Media traffic may include audio and/or video. In some cases, a token generation rate may be reduced in response to a decrease in the actual bandwidth. A ceil value for the token bucket may be changed in response to detecting a change in the actual bandwidth. A QoS for non-media traffic may be reduced in response to detecting a decrease in the actual bandwidth. A hierarchical token bucket may be allocated to a subscriber of an internet service provider (ISP), wherein multiple subscribers are associated with a single node in the mesh network. Unused bandwidth of the multiple subscribers associated with the node may be shared between the subscribers via the hierarchical token bucket.

In some embodiments, one or more alternate routes may be identified in response to detecting a change in the actual bandwidth. An estimated alternate bandwidth associated with the alternate route may be determined. A current route may be changed to the alternate route if the estimated alternate bandwidth is larger than the actual bandwidth. Upon detecting the actual bandwidth differing from the expected bandwidth, one or more wireless channels of at least one node in the network may be switched to one or more alternate channels.

A computing device configured to obscure content on a screen is also described. The device may include a processor and memory in electronic communication with the processor. The memory may store instructions that may be executable by the processor to monitor an actual bandwidth available to one or more computing devices in a network, and in response to the network monitoring module detecting a change in the actual bandwidth, change one or more quality of service (QoS) settings of the one or more computing devices A computer-program product to obscure content on a screen is also described. The computer-program product may include a non-transitory computer-readable medium that stores instructions. The instructions may be executable by the processor to monitor an actual bandwidth available to a node in a mesh network, and in response to the network monitoring module detecting a decrease in the actual bandwidth, decrease a token bucket depth of a token bucket for one or more computing devices associated with the node, decrease a token generation rate for the token bucket for the one or more computing devices associated with the node, and evaluate one or more alternate links between the node and one or more other nodes in the mesh network.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 8 illustrates one embodiment of a config file for a route cost daemon;

Figure 1:
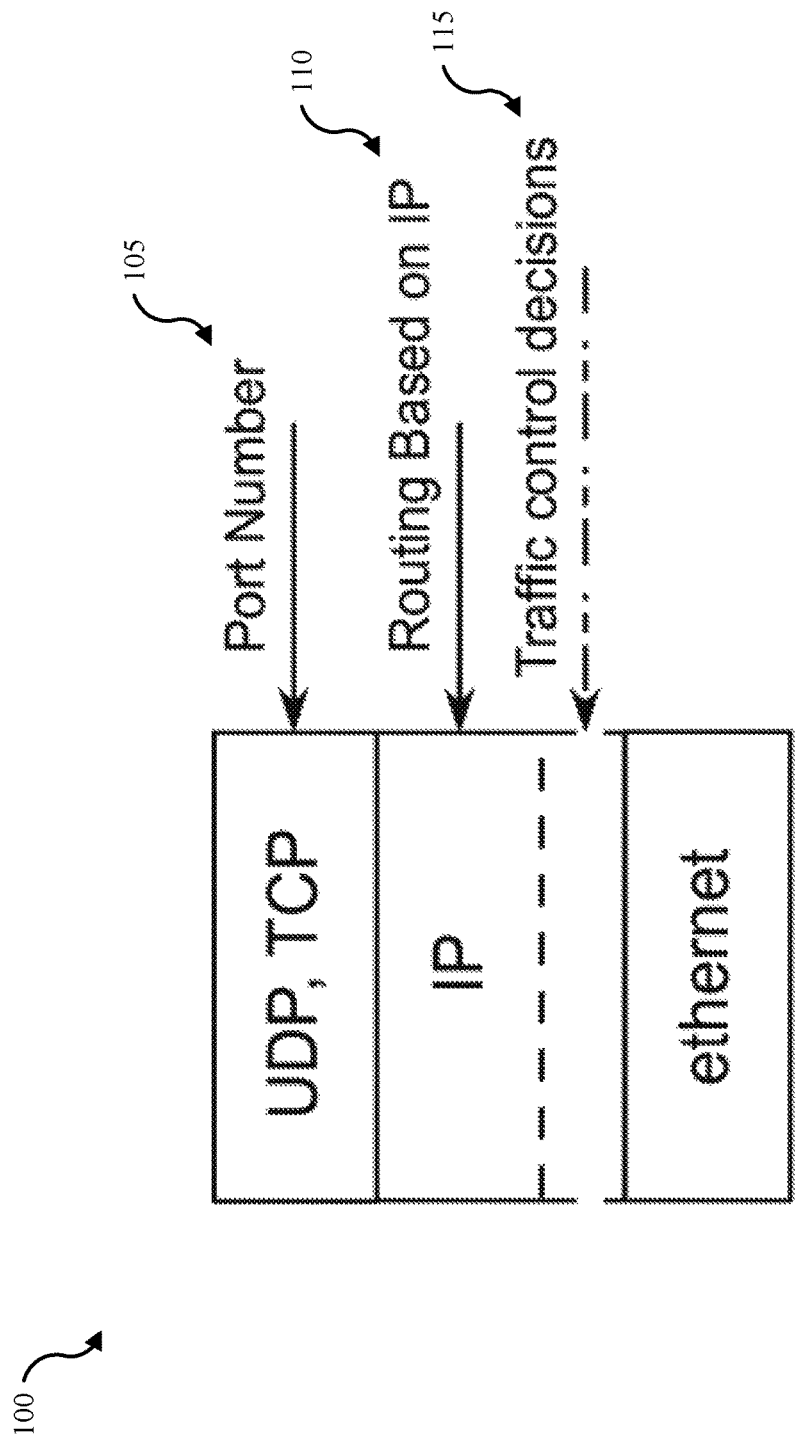
FIG. 1 illustrates the occurrence of traffic control decisions in the routing process.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

This disclosure, in one aspect, relates to approaches for dynamically adjusting to changes in bandwidth on a network. The approach may be realized as a system with a network monitoring module that monitors the actual bandwidth available to one or more computing devices in a network, and a bandwidth adaptation module that adjusts to changes in the actual bandwidth. The bandwidth adaptation module may change one or more QoS parameters of the computing devices, and may also instigate changes to the physical connection parameters of the network to improve the actual bandwidth.

Where the QoS settings make use of a token bucket, the bandwidth adaptation module may alter the token bucket depth and the token generation rate for the token bucket associated with devices on the network. The bandwidth adaptation module may change the ceil value for the token bucket to adjust to the change in the actual bandwidth.

The bandwidth adaptation module may change physical connection parameters as well. The bandwidth adaptation module may investigate alternate routes in a mesh network that may improve the bandwidth. The bandwidth adaptation module may instigate fast channel switching, as explained further below. As a result, the changes to the QoS settings and the network connection settings may together provide far better bandwidth and network reliability to the system.

Certain types of network traffic are particularly vulnerable to disruption. For example, seamless video streaming over wireless links imposes strong demands on video codecs and the underlying network. It is not sufficient that only the video codec, or only the radio, adapts to changes in the wireless link quality. Efforts may be be applied in both layers. In a preferred embodiment, the adaptations in the video codec and the radio are synchronized.

In addition to the above problems, background traffic over the same shared medium can introduce difficulties in providing a quality connection for real time applications and other applications that are sensitive to delay. For example, a large file download may be very disruptive to a VoIP phone call. The disturbing effect of possible background traffic over the same shared medium has to be taken into account.

The quality of a video or other media data transmission can be enhanced by applying link adaptation and cross-layer signaling techniques. Present methods of coping may be inadequate. For example, existing 802.11e/WMM alone is not sufficient to guarantee QoS. Traffic shapers lack congestion flow-control feedback loops. Forward error correction (FEC) is inefficient, and air-time fairness is not guaranteed. Transmit beamforming (TxBF) improves packet error rate, but it does not differentiate between flows in the same down link channel. TxBF thus may improve the packet error rate, but may be unable to prioritize traffic in an acceptable manner. MAC layer queuing methods in other vendor radio management layers are not able to discriminate between co-channel interferers, and such methods are not applicable beyond a chip generation. In automatic repeat request (ARQ), the delay can be intolerable and head of line blocking problems arise.

In the 802.11 domain there has been significant research effort in developing distributed rate adaptation schemes offering better performance than that of the current ARF (Automatic Rate Fallback). In the case of competition (media contention), users selfishly adapt their rates so as to maximize their own throughput, whereas in the case of cooperation they aim at adapting their rates to maximize the overall system throughput. Adaptive request to send and clear to send (RTS/CTS) does not make the competitive scenario more efficient.

Traditional 802.11e/Wi-Fi Multimedia (WMM) techniques alone are not sufficient to guarantee QoS in IEEE 802.11 networks. It may be beneficial to, at the IP layer, reconcile and rate limit streams that have a tendency to burst in order to maintain overall service level agreements.

On a network with fast local connections to organizations and a connection to Internet, the management of an upstream link to the Internet may require the implementation of a link-sharing mechanism. In the absence of such a mechanism, the default behavior of the gateways does not necessarily lead to a fair Internet bandwidth sharing among organizations.

The Internet is mostly based on TCP/IP which has some features that allow a network administrator to implement traffic control rules. TCP/IP does not know the capacity of the network between two hosts; packets are sent faster and faster, and when packets start getting lost, the connection will slow down. Generally speaking, resource management includes two types of services: (1) services for realtime traffic and (2) link-sharing mechanisms. In a congested network, a resource management mechanism may be required at the gateway.

The main functions of the link-sharing mechanism are: (1) enable routers to control the distribution of traffic on local links according to local needs so that each organization receives a guaranteed share of the link bandwidth during congested periods; (2) enable gateways to redistribute available bandwidth among organizations; (3) share bandwidth on a link between different protocol families, as different protocols may have different responses to congestion; and (4) accommodate new services and provide control traffic aggregation.

All of these requirements for link sharing may lead to a hierarchical link-sharing structure associated with a link in the network where each class in the structure corresponds to some traffic aggregation.

FIG. 1 illustrates a relationship between a port number 105, routing based on IP 110, and traffic control decisions 115. The traffic control mechanism 100 may come into play after an IP packet is queued for transmit on an output interface, but before the packet is actually transmitted by the driver. FIG. 1 shows where traffic control decisions 115 are made in relation to packet transmission on the physical Ethernet and the transport-layer protocols, such as UDP and TCP.

In order to implement a mechanism to enforce specific rules to specify who and how to use a link, the link-sharing structure may specify the desired division of the available bandwidth for a particular link, static or dynamic, so each class should be able to receive its allocated bandwidth when congestion occurs. When a class does not use its allocated bandwidth, the unused resources may be redistributed to other classes. A class refers to an organization or a logical group of networks.

Figure 2:
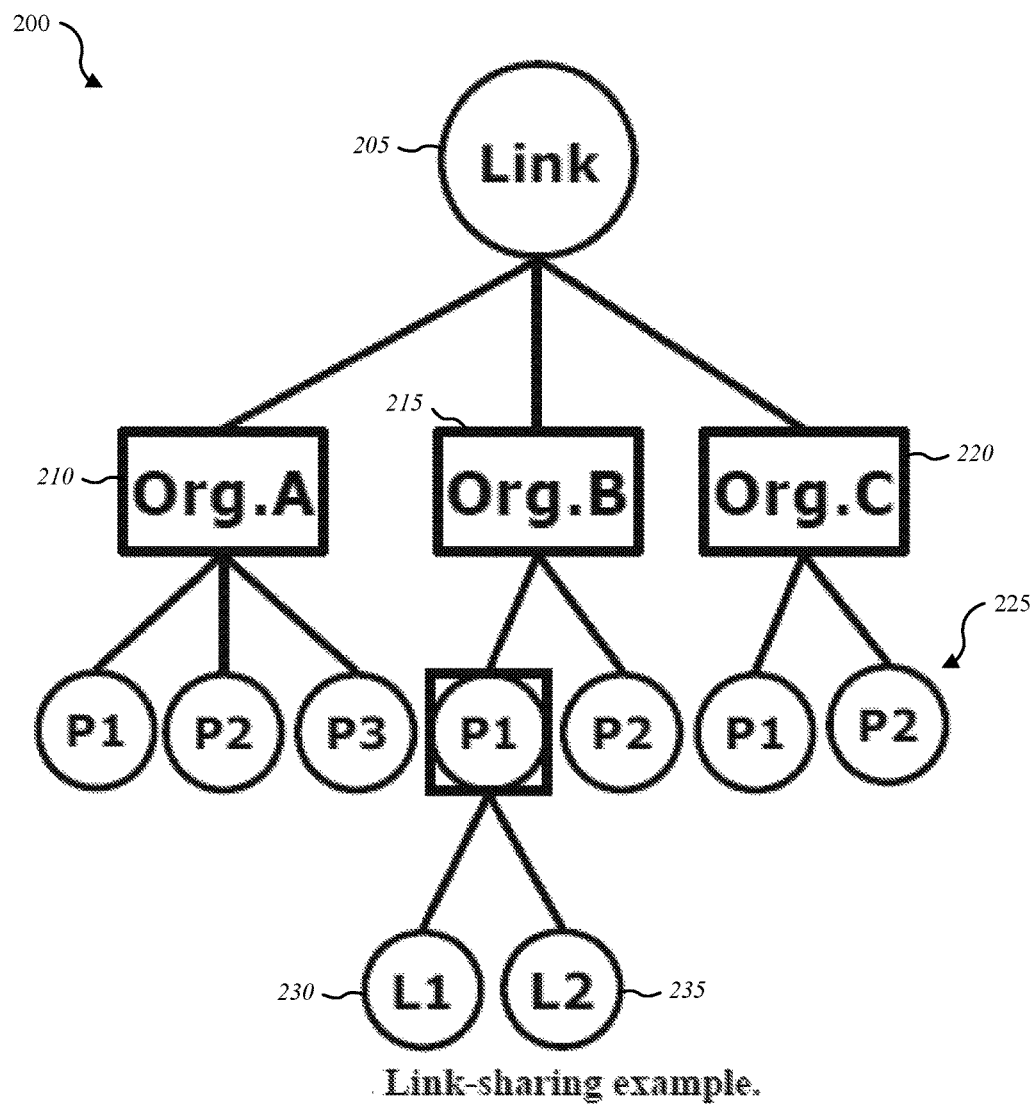
FIG. 2 illustrates one embodiment of a link-sharing example.

A hierarchical link sharing mechanism 200 can address multiple link-sharing constraints at the gateway (which may be represented as a top-level parent link) as shown in FIG. 2. A single link 205 is shared by three organizations: Org. A 210, Org. B 215, and Org. C 220. For each organization, traffic is scheduled by protocols 225 (e.g., P1, P2, P3) and the hierarchy can go down for individual link (e.g., L1 230 and L2 235) within a service class. In the hierarchy shown above, Org. B 215 receives a dedicated bandwidth amount from total bandwidth of the Link for the two protocols P1 and P2. If P1 does not have data to be sent, the "excess" bandwidth may be allocated to subclass P2 of Org. B 215.

To satisfy these needs, all arriving traffic at the gateway may be assigned to one of the leaf classes (i.e., the last subdivision of a given class). A class can be a leaf as shown in FIG. 1. For example, the P1 protocol is a parent class for both L1 230 and L2 235 and a leaf of the class Org. B 215.

QoS on Linux

For Linux based routers the incoming packets are either forwarded (if the machine is a router) or passed to the upper layers in the protocol stack (if the packet is destined for the computing device that received the packet). The packets that are forwarded are enqueued on a particular device queue. This queue is selected by the traffic controller based on QoS requirements, Service level agreements, and other considerations. A traffic controller may operate over an output queue.

In a typical Linux traffic processing device, there are generally three traffic control factors: (1) Queuing disciplines; (2) Classes; (3) Filters.

Queuing Discipline (Qdisc)

In one embodiment, every interface has a queuing discipline associated with it which controls how enqueued packets are treated. This discipline may vary from a simple one like FIFO to a queuing discipline that uses filters to distinguish different classes of packets and then processes them differently based on the classes.

Figure 3:
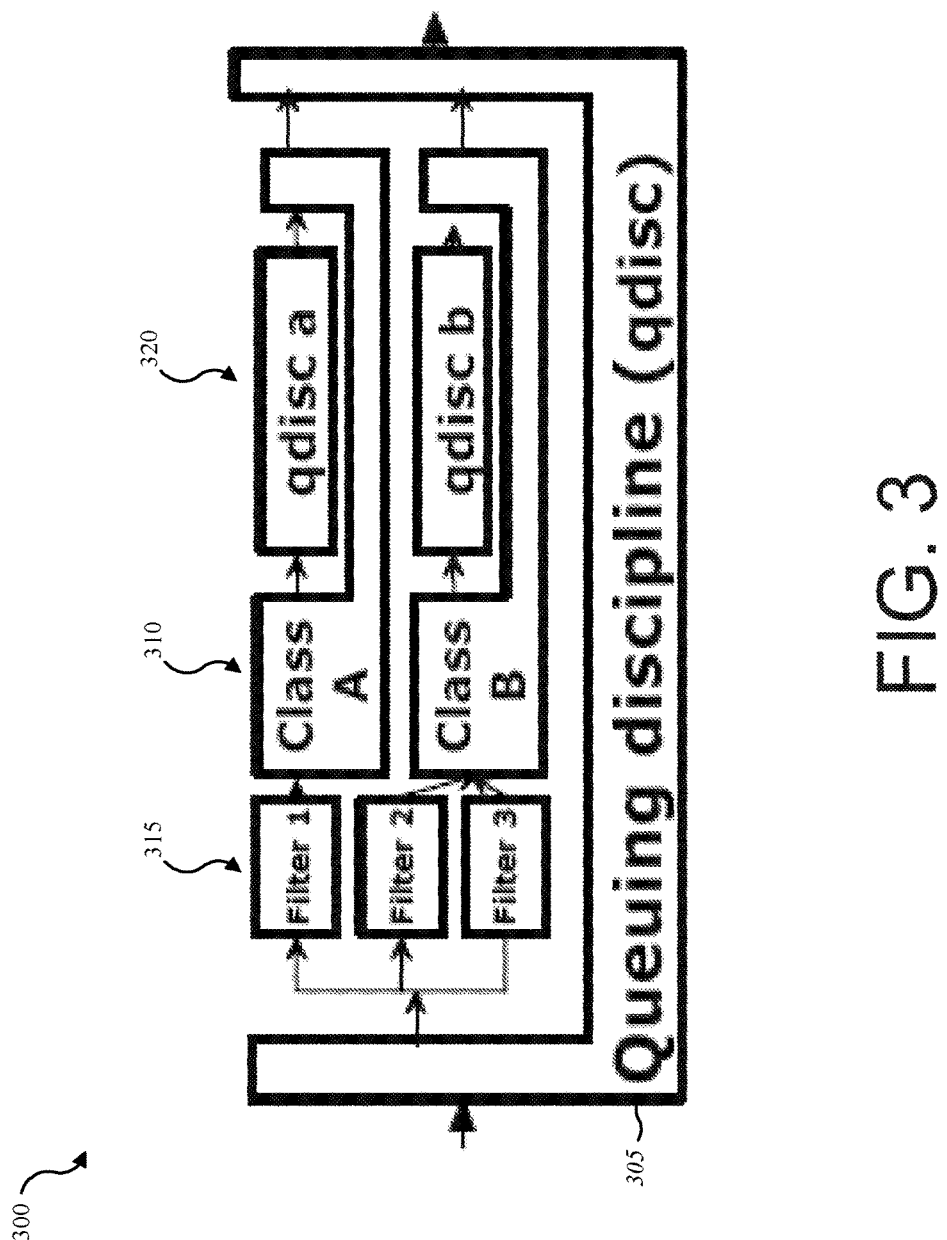
FIG. 3 illustrates one embodiment of a queuing discipline.

One embodiment of the relationships between classes, filters and queuing disciplines 300 is presented in FIG. 3. Classes and filters may be tied together to the queuing discipline 305. A queuing discipline 305 may be associated with one or more classes 310 (e.g., class A, class B, etc.). In one embodiment, every class 310 has a queuing discipline associated with it (e.g. qdisc a and qdisc b 320). Filters 315 may be used by the queuing discipline 305 to assign incoming packets to one of its classes 310. Various kinds of filters 315 can be used. For example, route classifiers and u32 filters based on the source, source port, destination, destination port, TOS byte and protocol.

Queuing Disciplines.

The most commonly used queuing disciplines are:

Pfifo_Fast—

This queue is, as the name says, First In, First Out, which means that no packet receives special treatment. This queue may be configured to have three bands. Within each band, FIFO rules apply. However, the three bands may have different priorities. For example, band zero may have a higher priority than band 1. As long as there are packets waiting in band zero, packets in band one won't be processed. The same may apply to the relationship between band one and band two. The kernel may use the bands to honor the Type of Service flag of packets, and may take care to insert minimum delay packets in band zero. For Linux kernels, pfifo_fast queueing discipline cannot be configured.

Token Bucket Filter (TBF)—

TBF is a simple qdisc that only passes packets arriving at a rate that does not exceed some administratively set rate. However, the TBF may allow short bursts in excess of this rate based on the number of tokens in a buffer, commonly referred to as a bucket. The bucket is constantly filled by some virtual pieces of information called tokens, at a specific rate (token rate).

A key parameter of the bucket is its size, that is, the number of tokens the bucket can store. Each arriving token collects one incoming data packet from the data queue, which is then permitted to move forward. The token associated with the data bucket is then deleted from the bucket. There are generally three possible scenarios for a TBF configuration: (1) incoming packets pass the queue without delay if every packet has its matching token. This scenario occurs if packets arrive in TBF at a rate that's equal to the rate that tokens are generated and inserted into the bucket; (2) the data arrives in TBF at a rate that's smaller than the token generation rate. In this scenario, only some of the tokens are used due to the output of the data packets that are sent out of the queue. As a result, tokens accumulate within the bucket up to the bucket size. The unused tokens in the bucket can be used to send data at a speed that's exceeding the standard token generation rate, allowing data bursts to occur; or (3) the data arrives in TBF at a rate larger than the token generation rate. This scenario results in the bucket being emptied of any existing tokens, and data packets arriving faster than new tokens are generated. When the bucket is out of tokens, the TBF throttles the data packets (and thus the traffic) while the excess data speeds occur. This is commonly called an overlimit situation. If packets continue to come in too quickly, the packets may start to get dropped. In this manner, the TBF may allow an administrator to shape the bandwidth available to data that passes through the TBF. The accumulation of tokens allows a short burst of overlimit data to be passed without loss, but any lasting overload will cause packets to be constantly delayed, and then dropped. In a typical Linux embodiment, Linux kernel tokens correspond to bytes and not packets.

Stochastic Fairness Queuing (SFQ)—

SFQ is a simple implementation of the fair queuing algorithms family. SFQ is typically less accurate than other queuing approaches, but generally requires less calculation while being almost perfectly fair. SFQ is based on flows which correspond to a TCP or UDP data stream. Traffic is divided into a number of FIFO queues, one for each conversation. Traffic is then sent in a round robin fashion, leading to very fair behavior and disallows any single conversation from drowning out the rest. In typical embodiments, SFQ does not actually allocate a queue for each session. Rather, SFQ divides traffic over a limited number of queues using a hashing algorithm.

Class Based Queue (CBQ)—

CBQ is a variation of priority queuing or a custom queuing used with operating systems intended to prevent starvation (resource denial) to any particular class of service. Using CBQ, several output queues can be defined and a preference for each of the queues may be set. This preference indicates the service preference and the amount of queued traffic in bytes that should be drained from each queue on each pass in service rotation.

Flow within Classful Qdiscs & Classes—

When traffic enters a classful qdisc, it may need to be sent to any of the classes within to provide classification. To determine what to do with a packet, filters are consulted. Filters are typically called within a qdisc. The filters attached to that qdisc then return with a decision, and the qdisc uses this to enqueue the packet into one of the classes. Each subclass may try other filters to see if further instructions apply. If not, the class enqueues the packet to the qdisc it contains. Besides containing other qdiscs, most classful qdiscs also perform shaping. This is useful to perform both packet scheduling (with SFQ, for example) and rate control.

CBQ Shaping—

Each interface typically has one egress root qdisc, using, by default, the earlier mentioned classless pfifo_fast queueing discipline. Each qdisc can be assigned to a handle, which can be used by later configuration statements to refer to that qdisc. Besides an egress qdisc, an interface may also have an ingress that polices traffic coming in to the interface. The handles of these qdiscs typically consist of two parts: a major number and a minor number. It is customary to name qdiscs in the fashion of "1:," the root qdisc being named "1:0," the minor number of the root qdisc being 0. Classes generally have the same major number as their parent. CBQ works by making sure that the link is idle just long enough to bring down the real bandwidth to the configured rate. To do so, it calculates the time that should pass between average packets. During operations, the effective idletime is measured using an exponential weighted moving average (EWMA), which considers recent packets to be exponentially more important than past ones. The unix loadaverage is calculated in the same way. The calculated idletime is substracted from the EWMA measured idletime. The resulting number may be referred to as avg-idle. A perfectly loaded link has an avg-idle of zero, meaning that packets arrive exactly once every calculated interval. Whereas, an overloaded link has a negative avg-idle. If the avg-idle becomes exceedingly negative (e.g., avg-idle exceeds a negative threshold), CBQ typically shuts down for a predefined time period and is subsequently started in an overlimit state. Conversely, an idle link might amass a relatively large avg-idle, which would then allow infinite bandwidths after a few hours of silence. To prevent this, avg-idle is typically capped at max-idle.

Some of the above issues are particularly acute in a wireless scenario. Wireless links typically introduce bottlenecks for a number of reasons. First, communication over a wireless channel is generally not able to achieve the same quality (throughput, error rate, etc.) as its wired counterpart. This often reduces the quality of the multimedia content that can be delivered. Second, in a mobile environment, the channel conditions can change rapidly due to changing distance between the stations (user mobility), Rayleigh fading, and interference. Since multimedia streaming applications must deliver their content in real time, they are very sensitive to jitter in packet delivery caused by retransmissions in the underlying transport protocols. Third, multimedia streaming may be done over a shared medium like 802.11 and interfere with other users who are performing other activities such as downloading files.

In one embodiment, in order to deliver the highest video quality, a combination of techniques may be implemented, namely: (1) Cross-layer link rate adaptation; and (2) Dynamic adjustment of flows based on RF conditions.

Using hardware triggers on a communications chipset, discriminating rules for traffic may be implemented. In one embodiment, the communications chipset is a 4×4 MIMO device such as the Quantenna QHS710.

Flow control for adjusting traffic flow may, in one embodiment, use a queuing method called Hierarchical Token Bucket (HTB). HTB is a new QoS technique recently introduced on Linux based routers that is focused on packet scheduling precision and ease of use. HTB, as an alternative to Class Based Queueing (CBQ) has gained acceptance in the Linux community. HTB has some advantages over other QoS techniques and especially compared with CBQ. It is less complex to implement, more intuitive, as well as more precise in traffic sharing implementations and borrowing technique. It ensures that at least the minimum amount of traffic for a class is provided and, when a class does not use its assigned traffic, the unused bandwidth is temporarily distributed to other classes.

Hierarchical Token Bucket is the most recent qdisc that supercedes WRR (Weighted Round Robin) and classfull TBF. HTB was developed for Linux based routers. It is essentially prioritized DRR (Deficit Round Robin) plus TBF in one. HTB may be used instead of CBQ because CBQ, implemented in Linux, often has low accuracy and high complexity. HTB has been developed as a replacement for CBQ qdisk in Linux based routers with precision and ease of use in mind. In CBQ, the linksharing policies must typically be specified.

The following are the main advantages of HTB over CBQ: (1) TBF can estimate idle time, so that only rate and burst must be specified; (2) HTB is more precise in rate estimation; (3) HTB allows precise borrowing control. For a class, a minimal rate and upper rate (ceil), which can be reached by borrowing from parent may be set; (4) HTB allows cross-device bandwidth sharing; (5) HTB conforms to TBF with a rate equal to the sum of the rates of all roots, and a burst equal to the sum of all bursts over all nodes in the worst case; and (6) in HTB, actual rates for all classes can be shown to control link-sharing policy implementations.

HTB assumes that the tree is complete, and traffic is divided into flows. The algorithm used for the packet schedule is, in one embodiment, first, select all leaves whose rate is not reached and send packets from them starting with high priority ones and continuing with lower priority leaves. For leaves with same priority, deficit round robin (DRR) is used. When rates for all leaves are exceeded, the whole cycle is repeated, but for each leaf a test is performed to find out if it can borrow from its parent instead of testing its own rate. When no such class remains the cycle is repeated, but attempts to borrow from a grandparent class.

Referring to FIG. 2, if class Org. A has higher priority than Org. B and both are borrowing from Org. C, then Org. A gets as much bandwidth as Org. A needs, and whatever bandwidth that remains is served to Org. B. If Org. B has the same priority as Org. A, then the borrowed bandwidth from Org. C is divided between Org. A and Org. B in the same proportion as their own base rates.

Figure 4:
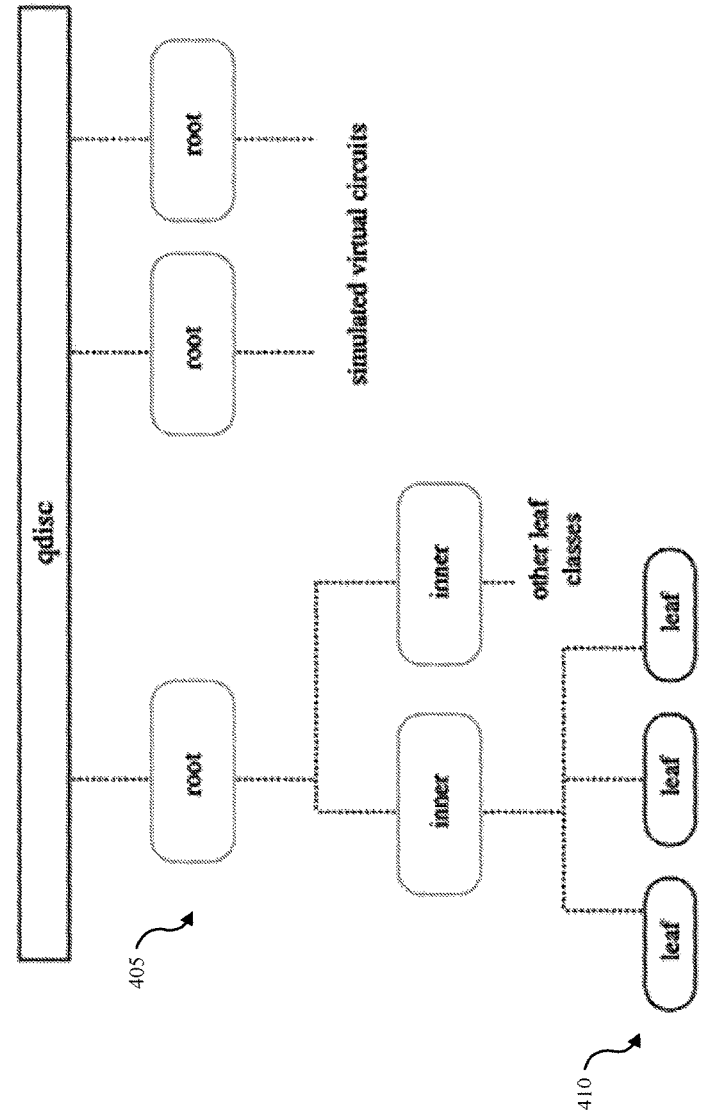
FIG. 4 is a schematic block diagram illustrating one embodiment of class structure and borrowing in a hierarchical token bucket.

FIG. 4 illustrates one embodiment 400 of the flow of borrowed tokens and the manner in which tokens are charged to parent classes. In one embodiment, in order for the borrowing model to work, each class keeps an accurate count of the number of tokens used by itself and all of its children. In such an embodiment, any token used in a child or leaf class may be charged to each parent class until the root class is reached.

Any child class that wishes to borrow a token will request to borrow a token from its parent class. Tokens used in a particular child class are charge to the parent that lent to that particular child class. The parent class, if it is also over its rate, will request to borrow from its parent class. This request process continues until either a token is located or the root class 405 is reached. The borrowing of tokens in such an embodiment thus flows toward the leaf classes 410, and the charging of the usage of tokens flows toward the root class 405.

Note that in FIG. 4 that there are several HTB root classes 405. Each of these root classes 405 may simulate a virtual circuit. HTB is typically slower but more precise than CBQ. CBQ generally maintains a top-level variable and cycles only over leaves. At each leaf, CBQ attempts to borrow from ancestors up to the top level. The rate is measured by timing the interval between packet edges. HTB typically cycles over leaves 410 more times, making it slower but more precise. The following terms are commonly used: (1) ceil—the maximum bandwidth a class can use. The ceil argument specifies the maximum bandwidth that a class can use. Ceil limits how much bandwidth a particular class can borrow. In one embodiment, the default ceil is the same as the rate; (2) burst—the amount of data that can be sent in a single session at the maximum (hardware) speed for a single class without serving another classes. In one embodiment, the value for burst cannot be set higher for a child class than for its parent class.

Figure 10:
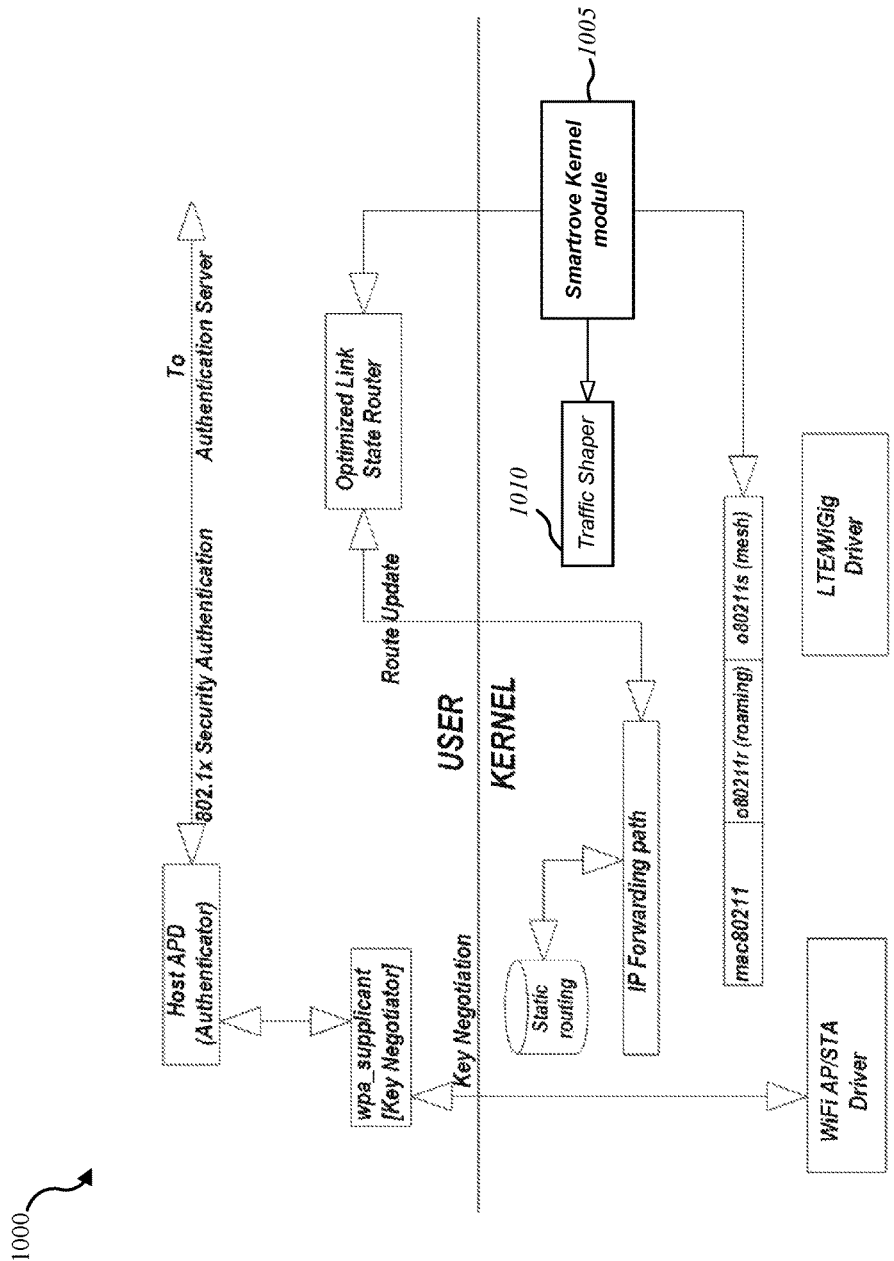
FIG. 10 illustrates one embodiment of a smartrove kernel module's involvement in traffic shaping.

HTB queuing disciplines are attached to a specified interface using usual handles as explained in the previous section for CBQ. FIG. 10 illustrates one embodiment 1000 of a smartrove kernel module 1005 and a traffic shaper 1010. A communications chip component, such as the QHS710 clear channel assessment module, may alert a rules-based traffic-shaping engine (e.g., traffic shaper 1010) to update rules to alter flows as shown in FIG. 10. Examples of such rules are provided below:

Create Rules:
```
#!/bin/sh
#tc class add dev eth0 parent 1:1 classid 1:10 htb rate 20 mbit burst 1 mbit ceil 20 mbit
#tc qdisc add dev eth0 parent 1:10 handle 10: pfifo
#tc filter add dev eth0 parent 1:0 protocol ip prio 1 u32 match ip dst 192.168.1.71/32 flow id 1:10
#tc class add dev eth1 parent 2:1 classid 2:10 htb rate 55 mbit burst 1 mbit ceil 55 mbit
#tc qdisc add dev eth1 parent 2:10 handle 20: pfifo
#tc filter add dev eth1 parent 2:0 protocol ip prio 1 u32 match ip dst 192.168.1.60/32 flow id 2:10
#tc class add dev eth1 parent 2:1 classid 2:11 htb rate 1 mbit burst 1 mbit ceil 5 mbit
#tc qdisc add dev eth1 parent 2:11 handle 30: pfifo
#tc filter add dev eth1 parent 2:0 protocol ip prio 10 u32 match ip dst 192.168.1.48/32 flow id 2:11
```

Delete Rules:
```
#!/bin/sh
#tc class del dev eth0 parent 1:1 classid 1:10 htb rate 10 mbit burst 1 mbit ceil 10 mbit
#tc qdisc del dev eth0 parent 1:10 handle 10: pfifo
#tc filter del dev eth0 parent 1:0 protocol ip prio 1 u32 match ip dst 192.168.1.71/32 flow id 1:10
#tc class del dev eth1 parent 2:1 classid 2:10 htb rate 10 mbit burst 1 mbit ceil 10 mbit
#tc qdisc del dev eth1 parent 2:10 handle 20: pfifo
#tc filter del dev eth1 parent 2:0 protocol ip prio 1 u32 match ip dst 192.168.1.48/32 flow id 2:10
```

Hardware assists may be used to control traffic shaping. The hardware assists may come from a fast channel switch and a wireless distributed system. Software modules that assist in the functioning of mesh routing may include a route cost daemon. By combining the IP layer rate limiting schemes, such as HTB, with intelligent 802.11 AP buffer management, there is very fine control over receive and transmit paths.

Software is conclusively proven on the following platforms, and algorithm verification is complete: WAPD110N (Atheros MIPS), GW2488 (Cavium dual core ARM), Q710 SoC (ARM). The radio chips supported are Atheros, Ralink, Quantenna.

Route Cost Daemon.

A route cost daemon may be used to assist in providing improved connectivity that accounts for changes in the network. The route cost between nodes in a network (such as a mesh network) may depend on various factors such as the link stability, signal strength measured by the signal-tonoise ratio (SNR), and the traffic patterns on the link. Greater amounts of traffic over a link may impose higher costs of sending data through the link. As the traffic patterns and the radio signal strength can vary over time, the route cost of the internodal links may have to be adjusted proportionately. The dynamic adjustments to route costs may be necessary to avoid traffic congestion and balance the traffic across the various paths in the mesh block.

In a wireless mesh network, various factors can affect a sustained rate of data flow. Change in SNR and signal strength can result in a loss of data and lowered throughput. Increase in traffic over a particular mesh link can result in traffic congestion over that data path. These changes are dynamic and can substantially affect the throughput performance across the network.

For a mesh network (or other type of network), it may be important that mesh management software have a built-in mechanism to dynamically respond to these network changes in order to maintain sustained throughput across the mesh links. For example, if the SNR on a particular link degrades, data should be routed through an alternate "high SNR quality" link in order to achieve service reliability. If a particular link experiences increased flow of traffic, the data should be routed through alternate "relatively less used" links in order to balance the load across the mesh network.

Figure 5:
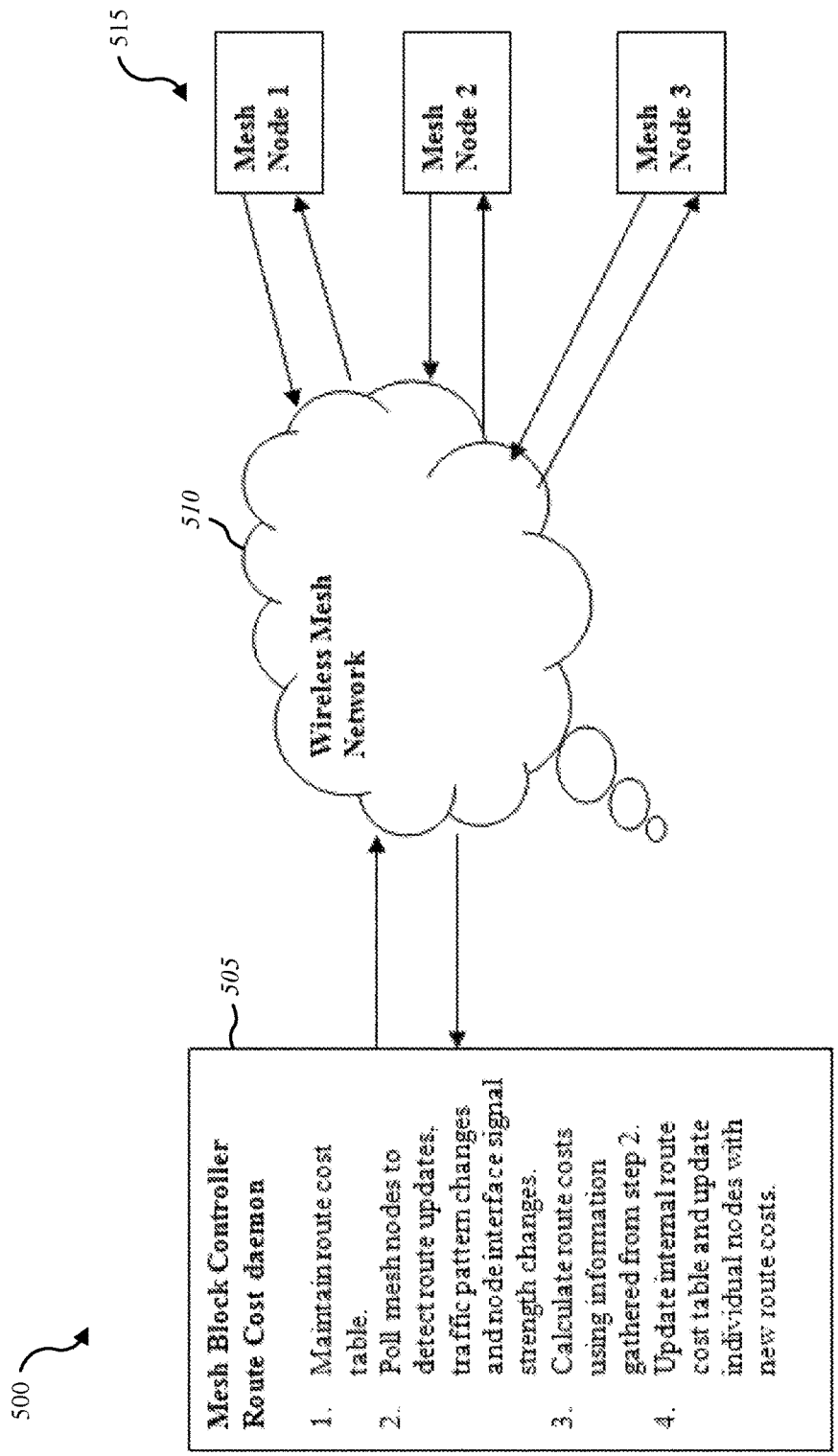
FIG. 5 illustrates one embodiment of deployment of a route cost daemon.

FIG. 5 illustrates one embodiment 500 of a mesh block controller (MBC) 505 that implements a route cost daemon (RCD) for facilitating communications on a mesh network 510. The RCD may be realized as a state machine that performs various functions. The RCD may, for example, on startup read a configuration file and query each node 515 (e.g., mesh nodes 1, 2, and 3) listed to obtain information using "remote shell" commands to execute binaries on each node 515. The following information may be obtained: (1) whether RouteCostMode is Auto or Manual; (2) routing table information using input and output controls (IOCTLs)

or standard Linux binaries; (3) route cost information for each route associated with a node 515 by doing "telnet" to Open Shortest Path First (OSPF) daemon running on a node 515; (4) SNR ratio by using IOCTLs or standard Linux binaries like "iwconfig."

The RCD may also gather and aid in generating traffic statistics on all interfaces associated with a node 515 using IOCTLs or standard Linux binaries like "ifconfig." If the configuration file parameter "RouteCostMode" is set to "Auto," the RCD may modify the interface cost based on SNR and bytes transferred. Otherwise, it may wait in a tight while loop and wait for the parameter to change to Auto.

The RCD may maintain a route cost table based on the information obtained as described above. The table (or other data structure) associated with each node 515 may store the following information: (1) Node IP address; (2) Network Interface information; (3) SNR associated with each interface; (4) traffic statistics associated with each interface; (5) individual route information; (6) traffic statistics associated with each link; and (7) cost associated with each link.

The RCD may also, in a continuous loop, pool the individual mesh nodes 515 and obtain interface information, routing information, SNR information for each interface, traffic statistics, and route costs. The RCD may compare this information with the existing information in the table and update it accordingly.

The RCD may also maintain a linked list of mesh nodes 515 and a linked list of "links." The linked list of links may be derived from the node interface and connectivity information. A links in this linked list may be connections between two interfaces, each of which reside on different mesh nodes 515.

The RCD may also re-calculate the cost for an interface if the SNR information or the traffic statistics for a node interfaces changes. The cost updates may be calculated based on a pre-determined costing mechanism that defines different route costs depending on various levels of SNR and the amount of traffic flowing through the link/interface. The newly-calculated costs may be updated in the route cost table and also sent to the individual nodes 515 involved in the link. The route cost information may be sent to the OSPF daemon on node 515 using the telnet interface or other supported network mechanisms.

Figure 6:
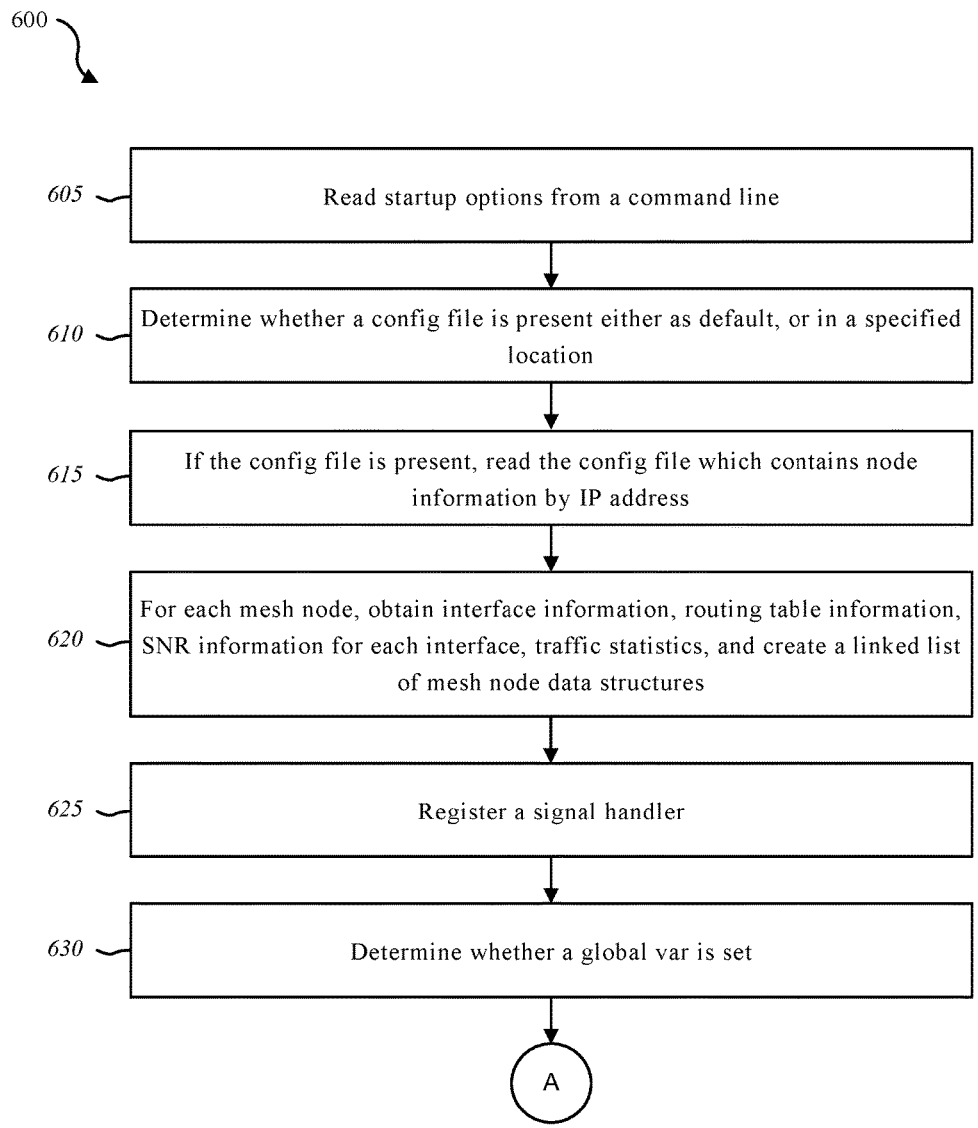
FIG. 6 illustrates a flow chart diagram depicting one embodiment of a mesh node process.

FIG. 6 illustrates a method 600 for an RCD. At block 605 startup options from a command line may be read. At block 610, it may be determined whether a config file is present either as default, or in a specified location. At block 615, if the config file is present, the method may involve reading the config file which contains node information by IP address. At block 620, for each mesh node, obtaining interface information, routing table information, SNR information for each interface, traffic statistics, and other information, and creating a linked list of mesh node data structures. At block 625, a signal handler may be registered. At block 630, it may be determined whether a global var is set (e.g., global var "Running").

Figure 7:
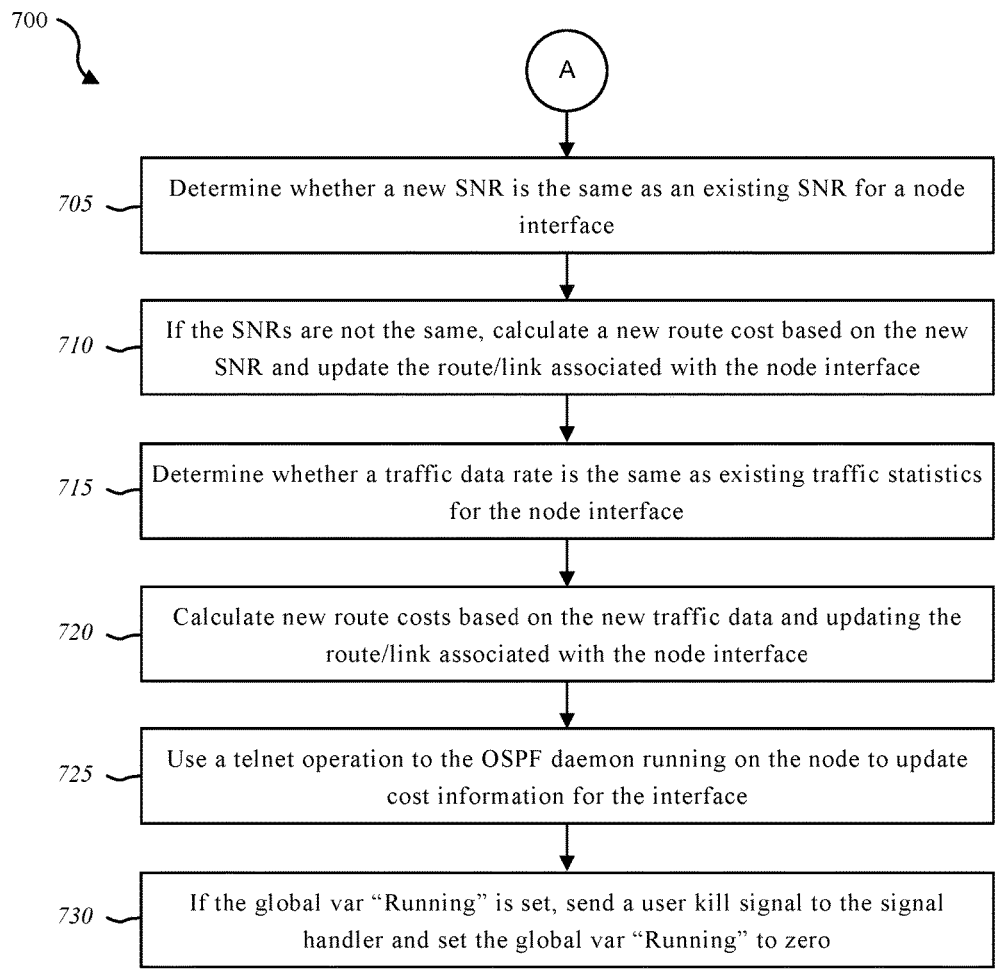
FIG. 7 illustrates a flow chart diagram depicting another embodiment of a mesh node process.

In one embodiment, if the global var is set, the method 600 of FIG. 6 may continue as shown in the method 700 of FIG. 7. At block 705, it may be determined whether a new SNR is the same as the existing SNR for the node interface. At block 710, if the SNRs are not the same, a new route cost may be calculated based on the new SNR and updating the route/link associated with the node interface.

At block 715, it may be determined whether the traffic data rate is the same as existing traffic statistics for the node interface. At block 720, new route costs may be calculated based on the new traffic data and updating the route/link associated with the node interface.

At block 725, a telnet operation to the OSPF daemon running on the node may be used to update cost information for the interface. At block 730, if the global var "Running" is set, a user kill signal may be sent to the signal handler and the global var "Running" may be set to zero.

In setting the configuration file, lines that being with a "#" character may be treated as a comment. Each mesh node may be defined as a separate section. One or more interfaces with corresponding IP addresses can be specified under the node. If the mode "RouteCostMode=Auto" is set, the RCD may modify the route costs depending on the SNR and bytes transferred by the interface, as discussed above. However, if the manual mode is set, the RCD may wait in a tight while loop doing nothing. Additional parameters for the configuration may also be added. In one embodiment, the configuration file 800 may be as shown in FIG. 8.

Figure 9:
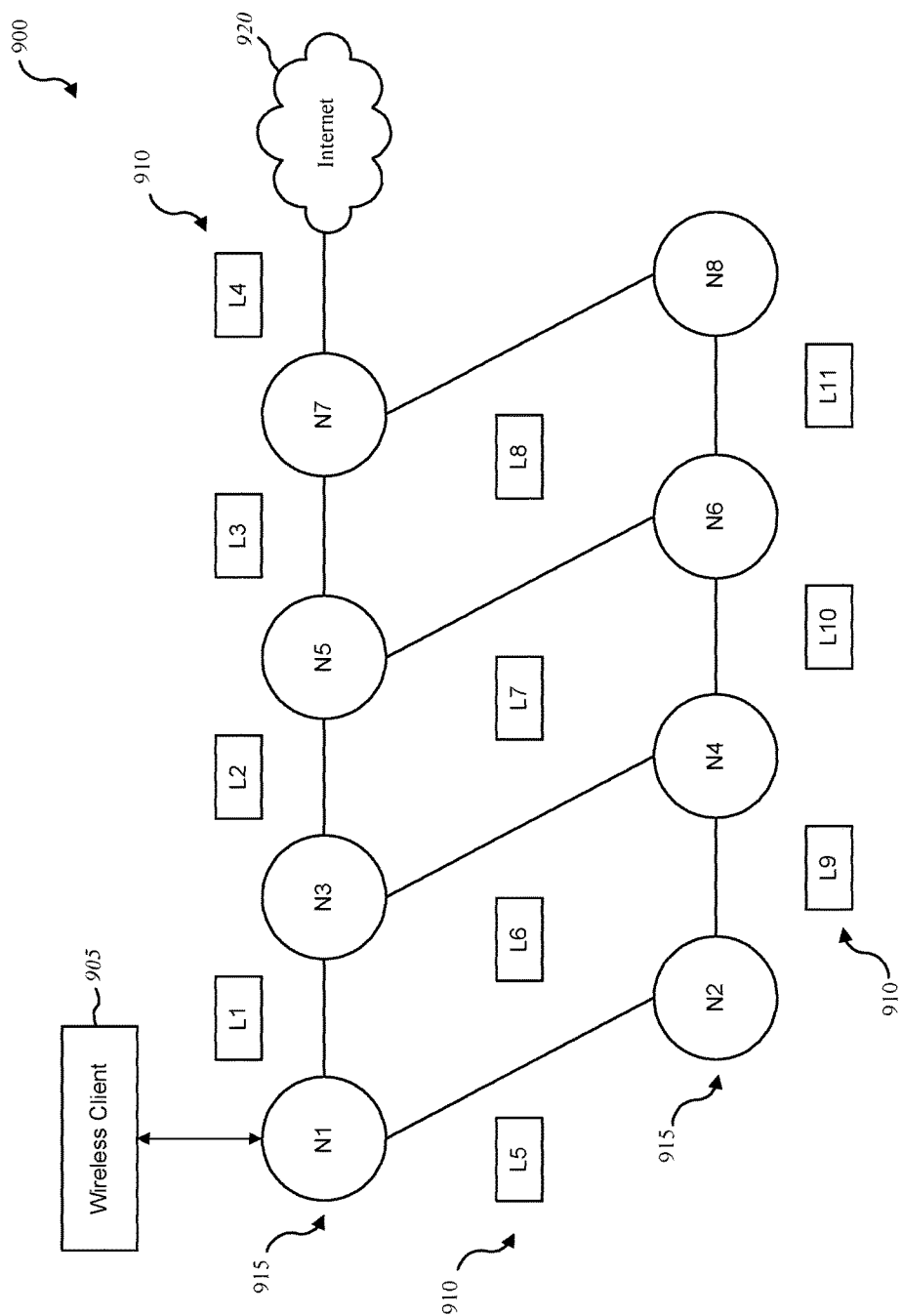
FIG. 9 illustrates one embodiment of a mesh block and associated link costs.

FIG. 9 illustrates one embodiment of an environment 900 illustrating costs associated with various routes. The environment 900 includes a wireless client 905, link costs 910 (e.g., L1-L11), nodes 915 (e.g., nodes N1-N8), and the Internet 920. FIG. 9 illustrates link costs 910 in association with paths between each node 915 (e.g., the path between N1 and N3, etc.). For example, the link cost L1 may be the sum of the interface cost of N1 and the interface cost of N3. Similarly, the link cost of L2 may be the sum of the interface cost of N3 and the interface cost of N5. In some cases, a route cost may be the sum of the link costs between the source and the destination. For example, the route cost from N1 to N6 may be L5+L9+L10, and so forth.

In one embodiment, the data structures described above may be configured as follows:

```
struct interface {
  char ifname [256]; ......................./* Interface name */
  int                                         type;
......................................................................
  /* Interface type STA, ETH, AP */
  u8 mac_addr [6]; ........................./* MAC address */
  u8 ip_addr [4]; ................................../* IP address */
  int                                         snr;
......................................................................
  /* signal to noise ratio */
  int                                         rxbytes;
......................................................................
  /* Rx bytes */
  int                                         txbytes;
......................................................................
  /* Tx bytes */
  struct interface *next;
  struct interface *prev;
} iface;
struct mesh_node {
  struct interface *iflist;
  int node_id;
  struct mesh_node *next;
  struct mesh_node *prev; ..................................
} node;
struct mesh_link {
  struct interface *if1;
  struct interface *if2;
  int route_cost;
```

```
struct mesh_link *next;
struct mesh_link *prev;
} link;
```

A network may also benefit from channel measurement and fast channel switch and channel scan features. A new kernel module (which may be referred to herein as a qtn-adm) may provide specific interfaces for calling functions and receiving responses to provide a simple, specific, and stable interface.

A fast channel switch feature may cause the AP and associated stations to switch channels, ideally with no lost packets, and no disassociation of the stations. Other connected APs may also switch to the new channel in sync with the parent AP, so an entire mesh network will change channels instantaneously, minimizing disruption for devices on the network. Fast channel switching may be achieved by sending a custom information element (IE) in outgoing beacons, which contain the channel to switch to, as well as the timing synchronization function (TSF) specifying when the channel switch will occur. Associated stations may listen for the beacon IEs and change channel when requested by their AP. This approach may be implemented using action frames. Once the channel change is completed, a callback registered by the kernel module may be called.

In a mesh network, several APs may be connected with wireless distribution system (WDS). A single AP may initiate a channel change and begin transmitting beacons with the custom IE. When other associated APs receive a beacon with the custom IE, they add the custom IE to their own outgoing beacons with the TSF adjusted according to the TSF difference between itself and the initiating AP. This may result in all APs and stations (STAs) in the network changing channels substantially simultaneously. This may be implemented using the channel switch announcement (CSA) element in action frames.

As well as the custom IE, an 802.11h CSA element may be added to outgoing beacons so that devices from various manufacturers supporting 802.11h channel switching can switch at approximately the same time, even if they lack modules to implement substantially simultaneous switching. There is a possibility of temporary data loss during the channel switch to a non-substantially switching enable device, as the timing accuracy obtainable through 802.11h channel switches is typically limited in accuracy to beacon intervals.

The sr module may provide the following interface for invoking a channel switch:
```
/*
 * register the callback to be called once a channel switch has
completed. This will be invoked for * all channel changes,
whether due to sr_trigger_channel_switch invoked on the
local AP, * channel change IEs from mesh peer APs, channel
change from radar events, channel changes * through local
UI, etc. This is not called for temporary channel changes
used in CCA * measurements. */
int     sr_register_channel_switch_callback   (struct
ieee80211com   *ic,   void   (*callback)(const   struct
iee80211_channel *new_channel, u_int64_t tsf));
/*
* Schedule a fast channel switch to occur at some point in
the future. It should be requested at a * time adequately far
in the future such that beacons can propogate to all APs in
a mesh network */
int sr_trigger_channel_switch(struct ieee80211com *ic,
const struct ieee80211_channel *new_channel, u_int64_t
tsf);
```

The sr_register_channel_switch_callback, in one embodiment, should be registered at startup as channel switches can occur when sr_trigger_channel_switch isn't called; channel changes caused by UI, radar, or channel changes caused by receiving a channel change request from another AP in a mesh network. The function may be called for any channel change other than temporary changes for CCA measurement of channel scans.

The interface may be in the form of an exported symbol from the "sr" kernel module. A Smartrove module may call these exported symbols to accomplish the channel switch. For this functionality, in one embodiment, two APIs are exported: sr_trigger_channel_switch and adm_register_channel_switch_callback. Their usage is explained through code snippets below:
```
/* Register the callback cca_callback with the sr module.
*/
if (sr_register_channel_switch_callback(ic, &csa_callback)) return −1;
}
/* with the given channel_index find the channel to switch
to */
ch=ic→ic_findchannel(ic,   channel_index,   ic→
ic_des_mode);
/* Get the current tsf using the API provided and modify
as necessary */
ic→ic_get_tsf(tsf);
/* Request the change to the channel at the required tsf*/
sr_trigger_channel_switch(ic, ch, tsf));
```

In one embodiment, the flow of events is as follows: (1) Smartrove module on all APs call sr_register_channel_switch_callback upon initialization; (2) Smartrove module on AP1 calls sr_trigger_channel_switch. AP1 starts adding custom IE and 802.11h IE to outgoing beacons/action frames. AP1 sets a timer to channel switch with desired channel switch TSF arrives; (3) Beacon with additional IEs sent from AP1 to associated stations and AP2; (4) AP2 receives beacon/action frame, registers a timer for channel switch on itself, and adds additional IEs to its own outgoing beacons/action frames. The Smartrove kernel module is not called at all. Stations also set this timer, but they have no outgoing beacon messages; (5) Beacon/action frames from AP2 to associated stations, and AP3; (6) AP3 adds timers+IEs to outgoing beacons/action frames; (7) Beacons with custom IEs are now emitted by all APs; (8) Timers on all APs and all stations should fire simultaneously; AP tx queues stop, channel switches, queues resume. All APs call the function registered with sr_register_channel_switch_callback; and (9) All APs and STAs are now on the new channel.

During the CCA measurement, sample signals may be collected to determine if, during the CCA collection on the new channel, radar was detected or not. This information, along with the CCA result, may be given to the caller. The caller can then take appropriate action, the default being to change to a different channel immediately.

An internal flow of events may occur as follows:
(1) Smartrovemodule calls sr_register_channel_switch_callback
 a. Occurs at module load
(2) Smartrovekernel module calls sr_trigger_channel_switch
 a. Request of form: Change to channel x at absolute tsf y.
(3) Smartrove kernel module calls calls ic→ic_set_channel_deferred(wlan), which is actually qtn_set_channel_deferred(qdrv).

a. Start transmitting beacons/action frames with 802.11h CSA+Qtn TSF Ies. The channel change information is currently received from the Action frame.

b. An input/output control (ioct1) is set up with all of the relevant information for changing channels. This information may include:

i. The channel to which the switch is made;
ii. The TSF to switch to this channel;
iii. How long before and after the switch to stop and resume tx queues; and
iv. Flags, e.g., whether to resume the tx queue at all (on a channel that needs CAC, this would be a no flag).

(4) Ioct1 goes from lhost→muc. Muc sets up 3 timer events:

a. switch TSF-pre time;
b. switch TSF; and
c. switch TSF+post time;

(5) Time passes . . .

(6) Switch tsf-pre time arrives, MuC calls ioct1_csa_pre_event a. MuC stops tx queue;
b. MuC stops rx—this hasn't been done yet as we may need to capture some information from the received packets;
c. Informs lhost through an interrupt (7) Lhost gets this interrupt, stops radar. See csa_irqhandler (8) Switch tsf arrives: MuC calls ioct1_csa_event
a. MuC changes channels (sets up vco etc)
b. informs lhost through an interrupt.

(9) Lhost gets second interrupt
a. restarts radar if necessary
b. updates ieee80211com datastructure

(10) Switch tsf+post time arrives, MuC calls ioct1_csa_post_event a. MuC restarts tx queue (need to test.)
b. informs lhost through interrupt

(11) Lhost gets third interrupt
a. Schedules work on csa_wq

(12) Lhost csa_workcalled
a. Marks entire process as complete in qdrv, release locks etc
b. Call callback registered by Smartrove kernel module.

A channel assessment feature may consist of two parts: a clear channel assessment part, and a radar detection part. A CCA (Clear Channel Assessment) measurement can be performed by monitoring the status of the RF chipset. Two bits in a particular register give values for "clear channel" and "clear secondary channel;" these bits are asserted if RF power on the respective channel is below a predetermined threshold. These bits can be sampled over a period of time to gather information about the amount of RF activity on a target channel. The device may temporarily change to the channel to be monitored, repeatedly sample the RF register, and then change back to the previous data channel. The inverse proportion of samples where the bit was asserted can be used to give a measurement of how busy the channel is.

Radar detection may be done during the same CCA sampling period where the signal pulse samples collected are used to determine if the Radar was detected or not. Since the sample period is very small, as compared to a continuous full CAC period, the upper layer is expected to continue probing the driver a number of times to achieve a greater probability of detecting radar. Over time, all the CCA info for all the channels can be collected and spectrum usage data is obtained.

In a mesh network, CCA measurement requests may be propagated to other associated APs through a mechanism very similar to that described above. However, a different custom IE may be used to signify that a CCA assessment should take place at the specified TSF rather than a channel switch. The objective is for all APs in the mesh network to perform a simultaneous measurement of activity on another channel. Once the CCA measurement is complete, a callback registered by the Smartrove kernel module may be called. Each individual AP reports its own measurement to its own Smartrove module through a callback function provided by the Smartrove module. The results from different APs in a mesh are collated by higher layer software. The intended use of this feature may be through the sr module. The API functions may trigger the following measurements:

```
/*
* Register the callback to be called when CCA scan results become
* available, whether requested by the local AP or due to beacons from
* mesh peer APs.
*/
int sr_register_cca_results_callback(struct ieee80211com *ic,
    void (*callback)(const struct ieee80211_channel *,
    struct out_cca_info));
/*
* Schedule a CCA scan at some point in the future
*
* Similarly to a channel switch, this should be scheduled far
* enough into the future for adequate beacon propogation to
* synchronize the CCA measurement
* across all APs in a mesh
int sr_trigger_cca_scan(
    struct ieee80211com *ic,
    const struct ieee80211_channel *chan,
    u_int64_t start_tsf,
    u_int32_t duration);
``` sr_trigger_cca_scan may initiate a request of the form schedule a CCA measurement to occur at tsf a for duration b on channel c with channel bandwidth d.

The output parameter structure may be, in one embodiment, as follows:

```
struct sr_cca_info {
    u_int32_t start_tsf[2]; /* The starting tsf */
    u_int32_t end_tsf[2]; /* The ending tsf */
    u_int32_t primary_cca; /* Number of samples where CCA bit was
    u_int32_t secondary_cca /* Number of samples where the CCA bit
    asserted for the primary channel */
    was asserted for the secondary channel
    */
    u_int32_t total_sample_count; /* Number of times the API iterated
    to collect samples */
    u_int8_t radar_detected; /* radar detectedtrue or false. */
};
```

The measured CCA value indicates the number of times per sample the Baseband detected energy level is above a certain threshold between the start and end tsf for a particular channel. Primary/secondary CCA units are in terms of the number of highs/total_sample_count. Radar_detected: in one embodiment, this is a Boolean result that reflects whether radar was detected during this sample period or not. Alternative means of using this feature are described in this section.

A command call_qcsapi start_cca wifi0 44 40 may issue an ioctl to the drive and fetch the CCA information measured on channel 44 for a duration of 40 milliseconds.

The syntax for a driver interface (IOCTL interface) may be the same as calling a regular IOCTL. The syntax may require filling in the wrq data structure with the required input including the interface and the channel number, then issue the IOCTL( ) call to do the measurement.

One example usage is as follows:
Userspace:
-----------
struct iwreq wrq;
struct in_cca_info in;
struct out_cca_info out;
in.cca_channel=44;
in.cca_duration=40; /* measure for 20 ms */
iwr.u.data.pointer=∈
iwr.u.data.length=sizeof(in);
ioctl(skfd, IEEE80211_IOCTL_STARTCCA, &iwr); /* Start the measurement */

The result of this get ioctl is returned in printed in the call-back function that was registered.

Kernelspace API:

In kernel space first a call back function is registered with a call to: sr_register_channel_switch_callback(struct ieee80211com *ic,
void (*callback)(const struct ieee80211_channel *new_channel, u_int64_t tsf));

then a call to sr_trigger_cca_scan(ic, ch, tsf, duration), where the channel number is the channel to switch to, the tsf is the time at which to start the measurement for "duration" amount of time.

The result of this get ioctl is returned in printed in the call-back function that was registered.

The channel measurement may be integrated with Linux drivers. For example, the request for the operation may start with a beacon received with the appropriate ID, or through the relevant API function. The smartrove module may interact with the WLAN layer, which will talk to the QDRV layer.

When the sr_trigger_cca_scan is called, the custom IE can be added to outgoing beacons to alert them that a CCA measurement will be performed soon. Once the desired TSF arrives, the qdry layer stops the tx queue at the linux host. The tx queue is disabled by disabling the network application programming interface (NAPI) to avoid reaping packets and then stops the device queue to stop the upper layers from sending packets. The device changes to the required channel and then sends a message to the MuC to start sampling CCA values on the new channel. Once the MuC has sampled CCA values for the specified time period, the device will switch back to the previous channel, tx queues will be restarted, and the results will be passed to the callback registered with sr_register_cca_results_callback.

Figure 11:
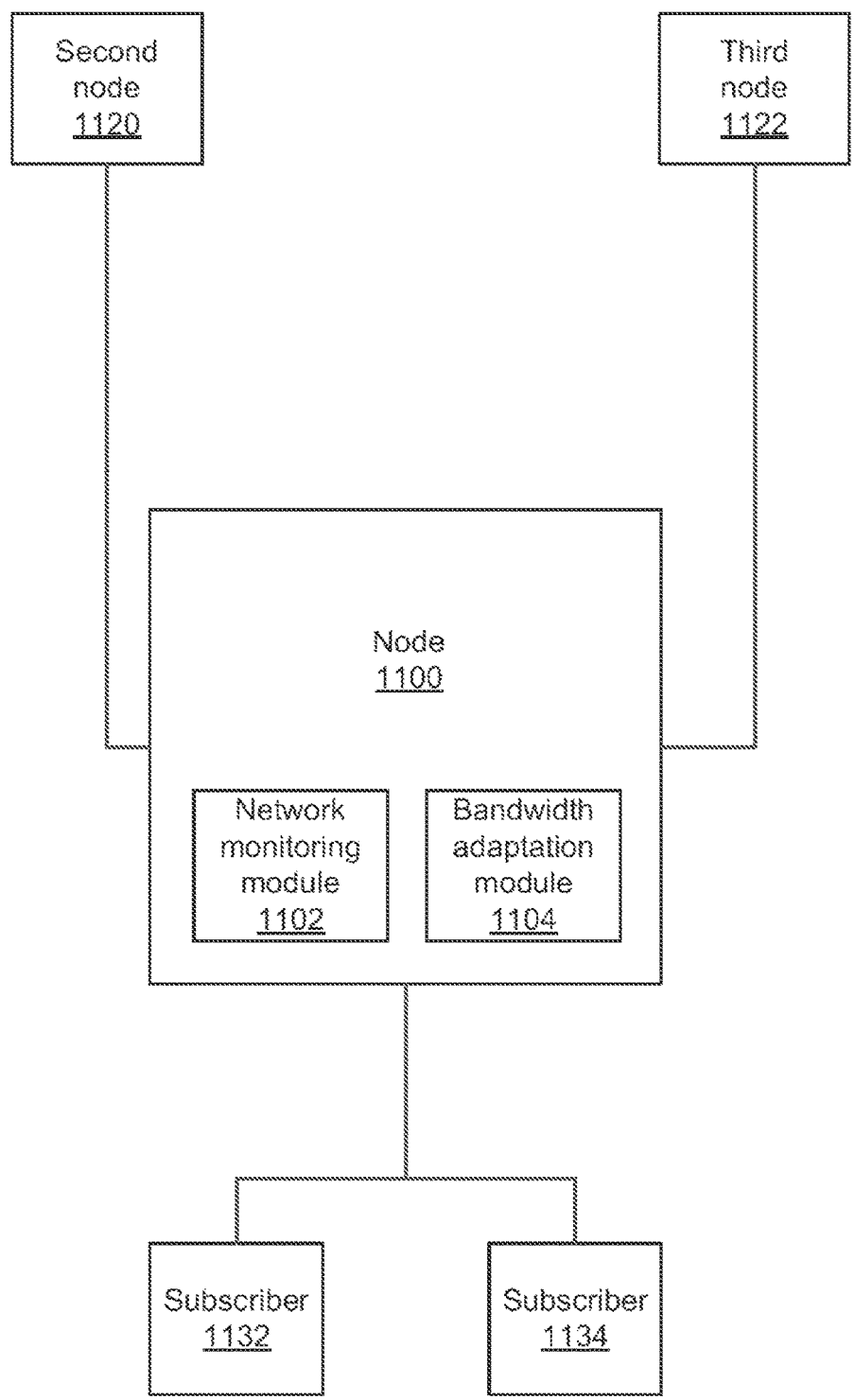
FIG. 11 illustrates one embodiment of a mesh network comprising multiple nodes providing access to multiple ISP subscribers.

FIG. 11 illustrates another embodiment of a mesh network comprising a node 1100, a second node 1120, and a third node 1122. In the illustrated embodiment, the nodes 1100, 1120, and 1122 may be configured by an ISP to provide an Internet connection to various subscribers. FIG. 11 illustrates two subscribers 1132 and 1134 that connect to the node 1100. The node 1100 may provide Internet access to the subscribers 1132 and 1134 in cooperation with the second node 1120 and the third node 1122.

The node 1100 may be configured with a network monitoring module 1102 and a bandwidth adaptation module 1104. The network monitoring module may be configured to monitor the actual bandwidth available to the node 1100 and the computing devices in the network. As mentioned above, various factors (such as weather, noise, etc) can affect the throughput of the node 1100. The network monitoring module 1102 may use various approaches described above, and others known in the art, to continually monitor the actual bandwidth available at the node 1100.

The bandwidth adaptation module 1104 may be configured to, in response to the network monitoring module 1102 detecting a change in the actual bandwidth, change one or more QoS settings of the node 1100 and/or other computing devices in communication with the bandwidth adaptation module 1104 in order to help the network smoothly manage the change in the actual bandwidth.

The bandwidth adaptation module 1104 may be further configured to change one or more physical connection parameters of the network to improve the actual bandwidth. The bandwidth adaptation module 1104 may take any of the steps described above (such as fast switching) and/or others in order to make adaptations to improve the actual bandwidth. The bandwidth adaptation module 1104 may, for example, identify alternate routes, determine an estimated alternate bandwidth associated with the alternate route, and change to the alternate route if the estimated alternate bandwidth is larger than the actual bandwidth.

The network may be a mesh network as described above, however, changes to the QoS settings may benefit network performance in other network environments as well. As such, this approach may be beneficial to various wireless networks, wired networks, and other types of network in addition to benefiting mesh networks.

As described above, the QoS settings may, in one embodiment, include a token bucket depth and a token generation rate for a token bucket that is associated with one or more devices on the network. For example, the subscribers 1132 and 1134 may each be associated with a token bucket to help allocate bandwidth evenly between them. As noted above, the node 1100 may implement a hierarchical token bucket approach that allows sharing of unused tokens between the subscribers 1132 and 1134.

In one embodiment, the bandwidth adaptation module 1104 changes the token bucket depth and the token generation rates of the token buckets. The bandwidth adaptation module 1104 may further change the ceil value associated with the token bucket. For example, if the actual bandwidth decreases, the token generation rate and the token bucket depth may be decreased. In one embodiment, the change in the QoS parameters may be proportionate to the change in the bandwidth. Thus, a 10% decrease in bandwidth may result in a proportionate decrease in bucket depth. In one embodiment, the bandwidth adaptation module 1104 may include one or more data structures (such as tables) that associate appropriate QoS settings for a given actual bandwidth.

The bandwidth adaptation module 1104 may be configured to require multiple, consistent readings of a change in the actual bandwidth before changing the QoS settings. Such an embodiment may help prevent needless changes when the actual bandwidth temporarily fluctuates.

In certain embodiments, the changes to the QoS settings may vary based on traffic type. For example, the bandwidth adaptation module 1104 may further prioritize time sensitive traffic such as multimedia traffic. Such an approach may help the node 1100 adequately support video streaming, VoIP, and other applications in the face of decreased bandwidth. Other traffic (such as web browsing) may be given a lower priority in response to the change in the bandwidth.

In one embodiment, a method for managing bandwidth may involve setting one or more QoS parameters of a client of a mesh network based on an expected bandwidth for the mesh network, measuring the actual bandwidth of the mesh network, and automatically changing one or more QoS parameters of the client in response to the actual bandwidth differing from the expected bandwidth. The change in the QoS parameters may be tailored to compensate for the difference between the actual bandwidth and the expected bandwidth.

The method may also involve, as described above, taking action to change physical connection parameters (such as the route, channel, etc) in order to improve the actual bandwidth. Where the QoS parameters include hierarchical token bucket parameters, the method may involve changing the depth of the token bucket and the token generation rate. The QoS parameters may be changed for non-media traffic.

Figure 12:
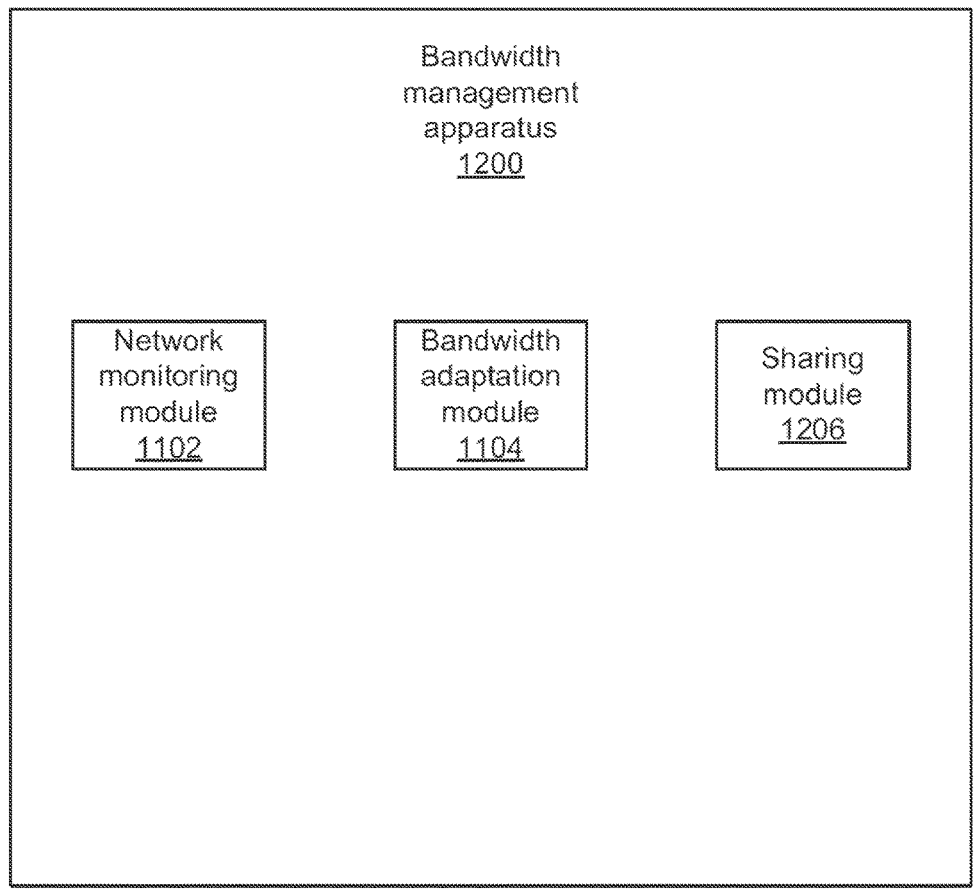
FIG. 12 is a schematic block diagram illustrating one embodiment of a bandwidth management apparatus.

FIG. 12 illustrates a block diagram of a bandwidth management apparatus 1200. The bandwidth management apparatus 1200 may be configured to adjust the QoS settings in response to a change in the bandwidth on the network. The bandwidth management apparatus 1200 may be deployed on a node in a wireless mesh network. In other embodiments, the bandwidth management apparatus 1200 may be distributed across multiple devices and may be realized as hardware, firmware, software, or a combination thereof.

The bandwidth management apparatus 1200 may include a network monitoring module 1102 that monitors the actual bandwidth available to a node in a mesh network as described above. The bandwidth adaptation module 1104 may, in response to the network monitoring module 1102 detecting a decrease in the actual bandwidth, decrease the token bucket depth of a token bucket for various computing devices associated with the node on which the bandwidth management apparatus 1200 is deployed. The bandwidth adaptation module 1104 may also decrease the token generation rate for the token bucket and evaluate alternate links between the node and other nodes in the mesh network.

The sharing module 1206 may be configured to manage the sharing of unused tokens among devices (such as those of various subscribers) that are associated with the node.

Figure 13:
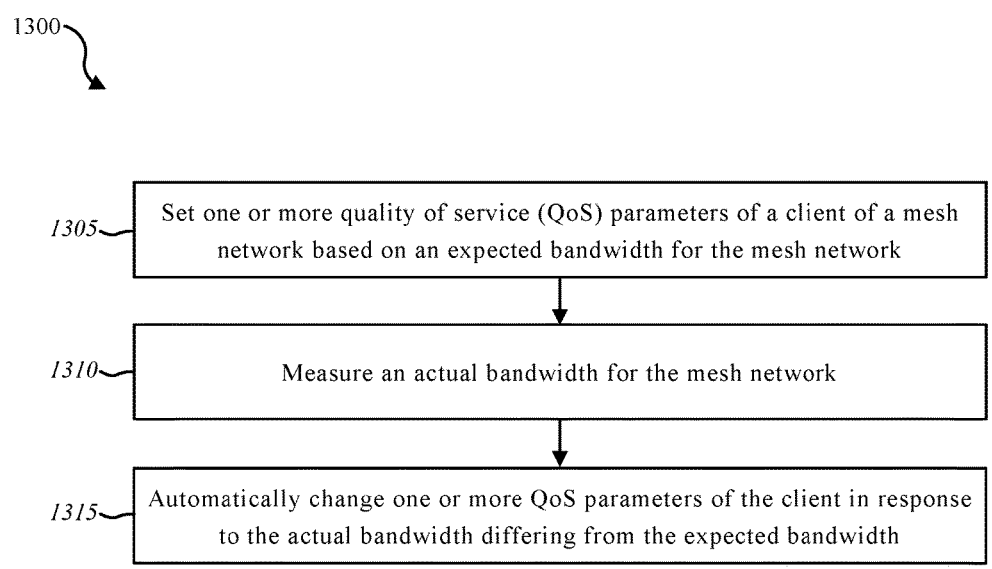
FIG. 13 illustrates a flow chart diagram depicting a method for dynamic adjustment of quality of service parameters.

FIG. 13 illustrates a flow chart diagram depicting a method 1300 for dynamic adjustment of quality of service parameters. In some configurations, the method 1300 may be implemented by the bandwidth management apparatus 1200 illustrated in FIG. 12. In some configurations, the method 1300 may be implemented in conjunction with the one or more elements depicted in FIGS. 9-11.

At block 1305, one or more quality of service (QoS) parameters of a client of a mesh network may be set based on an expected bandwidth for the mesh network. At block 1310, an actual bandwidth for the mesh network may be measured. At block 1315, one or more QoS parameters of the client may be automatically changed in response to the actual bandwidth differing from the expected bandwidth. The change in the QoS parameters may be configured to compensate for the difference between the actual bandwidth and the expected bandwidth.

Regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Although the foregoing description contains many specifics, these should not be construed as limiting the scope of the present invention, but merely as providing illustrations of some of the presently preferred embodiments. The examples given in the application are by way of illustration, and are non-limiting examples. Similarly, other embodiments of the invention may be devised which do not depart from the spirit or scope of the present invention. Features from different embodiments may be employed in combination. The scope of the invention is, therefore, indicated and limited only by the appended claims and their legal equivalents, rather than by the foregoing description. All additions, deletions and modifications to the invention as disclosed herein which fall within the meaning and scope of the claims are to be embraced thereby. The appended claims are not means-plus-function claims as set forth in 35 U.S.C. § 112, sixth paragraph, unless the particular claim uses the phrase "means for."

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for dynamic adjustment of quality of service (QoS) parameters comprising:
   monitoring an actual bandwidth available to one or more computing devices in a network;
   detecting a change in the actual bandwidth;
   in response to detecting a change in the actual bandwidth, changing one or more QoS parameters, wherein a change in a QoS for media traffic is different from a change in a QoS for non-media traffic;
   identifying one or more alternate routes in response to detecting a change in the actual bandwidth; and
   changing to the alternate route if an estimated alternate bandwidth is larger than the actual bandwidth.

2. The method of claim 1, further comprising:
   determining the estimated alternate bandwidth associated with the alternate route.

3. The method of claim 1, wherein a change in the one or more QoS parameters compensates for a difference between the actual bandwidth and an expected bandwidth.

4. The method of claim 1, further comprising:
   upon detecting the change in the actual bandwidth, changing one or more physical connection parameters of the network to improve the actual bandwidth.

5. The method of claim 1, wherein the QoS parameters comprise one or more hierarchical token bucket parameters of a token bucket.

6. The method of claim 5, further comprising:
   adjusting a depth of the token bucket in response to detecting the change in the actual bandwidth.

7. The method of claim 6, wherein adjusting the depth of the token bucket further comprises:
   reducing the depth of the token bucket in response to detecting a decrease in the actual bandwidth.

8. The method of claim 5, further comprising:
   reducing a token generation rate in response to a decrease in the actual bandwidth.

9. The method of claim 5, further comprising:
   changing a ceil value for the token bucket in response to detecting the change in the actual bandwidth.

10. The method of claim 1, further comprising:
    adjusting the QoS for media traffic in response to detecting the change in the actual bandwidth.

11. The method of claim 10, wherein adjusting the QoS for media traffic further comprises:
    increasing the QoS for media traffic in response to the decrease in the actual bandwidth, wherein media traffic comprises one or more of video and audio.

12. The method of claim 1, further comprising:
    allocating a hierarchical token bucket to a subscriber of an internet service provider (ISP), wherein multiple subscribers are associated with a node in the network.

13. The method of claim 12, wherein unused bandwidth of the multiple subscribers associated with the node is shared between the multiple subscribers via the hierarchical token bucket.

14. A computing device configured for dynamic adjustment of quality of service (QoS) parameters comprising:
    a processor;
    memory in electronic communication with the processor;
    instructions stored in the memory, the instructions being executable by the processor to:
      monitor an actual bandwidth available to one or more computing devices in a network;
      detect a change in the actual bandwidth;
      in response to detecting a change in the actual bandwidth, change one or more QoS parameters, wherein a change in a QoS for media traffic is different from a change in a QoS for non-media traffic;
      identify one or more alternate routes in response to detecting a change in the actual bandwidth; and
      change to the alternate route if an estimated alternate bandwidth is larger than the actual bandwidth.

15. The computing device of claim 14, wherein the instructions are executable by the processor to:
    determine the estimated alternate bandwidth associated with the alternate route.

16. The computing device of claim 14, wherein a change in the one or more QoS parameters compensates a difference between the actual bandwidth and an expected bandwidth.

17. The computing device of claim 14, wherein the instructions are executable by the processor to:
    change one or more physical connection parameters of the network to improve the actual bandwidth upon detecting the change in the actual bandwidth.

18. The computing device of claim 14, wherein the QoS parameters comprise one or more hierarchical token bucket parameters of a token bucket.

19. A computer-program product for dynamically adjusting, by a processor, quality of service parameters (QoS), the computer-program product comprising a non-transitory computer-readable medium storing instructions thereon, the instructions being executable by the processor to:
    monitor an actual bandwidth available to one or more computing devices in a network;
    detect a change in the actual bandwidth;
    in response to detecting a change in the actual bandwidth, change one or more QoS parameters, wherein a change in a QoS for media traffic is different from a change in a QoS for non-media traffic;
    identify one or more alternate routes in response to detecting a change in the actual bandwidth; and
    change to the alternate route if an estimated alternate bandwidth is larger than the actual bandwidth.

20. The computer-program product of claim 19, wherein the instructions are executable by the processor to:
    determine the estimated alternate bandwidth associated with the alternate route.

* * * * *